(12) United States Patent
Covannon et al.

(10) Patent No.: US 7,008,288 B2
(45) Date of Patent: Mar. 7, 2006

(54) INTELLIGENT TOY WITH INTERNET CONNECTION CAPABILITY

(75) Inventors: Edward Covannon, Ontario, NY (US); David L. Patton, Webster, NY (US); Thomas M. Stephany, Churchville, NY (US); Kathryn K. Nass, Macedon, NY (US)

(73) Assignee: Eastman Kodak Company, Rochester, NY (US)

( * ) Notice: Subject to any disclaimer, the term of this patent is extended or adjusted under 35 U.S.C. 154(b) by 472 days.

(21) Appl. No.: 09/915,448

(22) Filed: Jul. 26, 2001

(65) Prior Publication Data

US 2003/0027636 A1 Feb. 6, 2003

(51) Int. Cl.
*A63F 13/00* (2006.01)

(52) U.S. Cl. ............... 446/298; 446/301; 434/308; 463/29; 463/42; 463/43

(58) Field of Classification Search ............... 463/42, 463/29, 43; 446/71, 298, 301; 434/308
See application file for complete search history.

(56) References Cited

U.S. PATENT DOCUMENTS

| 4,819,076 A | 4/1989 | Briggs |
| 4,846,693 A | 7/1989 | Baer |
| 4,973,052 A | 11/1990 | Conti |
| 5,260,869 A | 11/1993 | Ferrier et al. |
| 5,447,166 A | 9/1995 | Gevins |
| 5,466,213 A | 11/1995 | Hogan et al. |
| 5,481,257 A | 1/1996 | Brubaker et al. |
| 5,555,019 A | 9/1996 | Dole |
| 5,601,435 A | 2/1997 | Quy |
| 5,626,144 A | 5/1997 | Tacklind et al. |
| 5,633,484 A | 5/1997 | Zancho et al. |
| 5,636,994 A | 6/1997 | Tong |
| 5,687,734 A | 11/1997 | Dempsey et al. |
| 5,735,726 A | 4/1998 | Cohen |
| 5,746,602 A | 5/1998 | Kikinis |
| 5,752,880 A | 5/1998 | Gabai et al. |
| 5,814,798 A | 9/1998 | Zancho |
| 5,819,178 A | 10/1998 | Cropper |
| 5,870,527 A | 2/1999 | Fujikawa et al. |
| 5,873,765 A | 2/1999 | Rifkin et al. |
| 5,890,907 A | 4/1999 | Minasian |
| 5,915,220 A | 6/1999 | Chelliah |
| 5,933,778 A | 8/1999 | Buhrmann et al. |
| 5,949,326 A | 9/1999 | Wicks et al. |
| 5,975,979 A | 11/1999 | Ferri Llorens |
| 5,989,092 A | 11/1999 | McGowan et al. |
| 6,007,404 A | 12/1999 | Trevino |
| 6,012,961 A | 1/2000 | Sharpe, III et al. |
| 6,014,080 A * | 1/2000 | Layson, Jr. ................. 340/539 |

(Continued)

OTHER PUBLICATIONS

Scientific American Feature Article: Computing With Oxygen; Aug. 1999; Talking With Your Computer; Victor Zue; pp 1-3.

(Continued)

*Primary Examiner*—John M. Hotaling, II
(74) *Attorney, Agent, or Firm*—Frank Pincelli (57) ABSTRACT

A system, method and computer software product for controlling the operation of a device in accordance with a user's personal profile or local environment. The device is designed for interaction with a user based on the personal or an environment profile and includes a wireless communication device for communicating with a computer. The computer providing instructions to the device for controlling the operation of the device based on gathered data and in response to a stored user's personal profile.

26 Claims, 8 Drawing Sheets

U.S. PATENT DOCUMENTS

| | | | |
|---|---|---|---|
| 6,028,866 A | * | 2/2000 | Engel et al. ................. 370/312 |
| 6,055,512 A | | 4/2000 | Dean et al. |
| 6,084,584 A | * | 7/2000 | Nahi et al. .................. 345/156 |
| 6,104,334 A | * | 8/2000 | Allport .................. 340/825.24 |
| 6,169,902 B1 | * | 1/2001 | Kawamoto ............. 342/357.12 |
| 6,202,060 B1 | * | 3/2001 | Tran ........................ 707/104.1 |
| 6,256,019 B1 | * | 7/2001 | Allport ........................ 283/74 |
| 6,287,200 B1 | * | 9/2001 | Sharma ....................... 463/39 |
| 6,401,085 B1 | * | 6/2002 | Gershman et al. ............. 705/2 |
| 6,418,472 B1 | * | 7/2002 | Mi et al. .................... 709/202 |
| 6,527,641 B1 | * | 3/2003 | Sinclair et al. ............... 463/39 |
| 6,554,707 B1 | * | 4/2003 | Sinclair et al. ............... 463/39 |
| 2002/0065109 A1 | * | 5/2002 | Mansikkaniemi et al. .. 455/566 |
| 2002/0065713 A1 | * | 5/2002 | Awada et al. ................. 705/14 |
| 2002/0174117 A1 | * | 11/2002 | Nykanen ....................... 707/4 |

OTHER PUBLICATIONS

Scientific American Feature Article: The Oxygen Project; Aug. 1999; Communications Chameleons; John F. Guttag; pp 1-3.

Scientific American: Feature Article: The Oxygen Project; Aug. 1999; Raw Computation; Anant Agarwal; pp 1-5.

Scientific American Feature Article: The Oxygen Project; Aug. 1999; The Future of Computing; pp 1-7.

* cited by examiner

INTELLIGENT TOY WITH INTERNET CONNECTION CAPABILITY

FIELD OF THE INVENTION

This invention relates generally to the field of interactive devices and particularly to the methods and apparatus that produce a system, resulting in the enhanced capability of such devices. For example, by using a combination of technologies including but not limited to, image and voice recognition, wireless connectivity and networking capability, an interactive device can tailor itself to an individual and a changing environment and enable that environment to tailor itself to the device and the device's user, thus demonstrating enhanced capabilities while reducing cost by leveraging external resources that provide the device with augmented abilities.

BACKGROUND OF THE INVENTION

Advances in technology have given interactive devices an increasing number of capabilities. This in turn has allowed a user of an interactive device to be able to make choices on how interacting with the device will proceed. For example, in the case of a toy, the more complex the toy's interaction with the user, the more complex and engaging the play becomes, thus expanding the number of opportunities for education, guidance and supervisory functions that the toy can provide. Traditionally, increasing complexity of the toy raises costs and increases fragility, which affects the mortality of the toy. Also, toys that are simple in construction and low in cost, are generally regarded as being incapable of complex interactions with the user of a toy.

Two approaches to increasing the capability of the toy have been used, both of which suffer from one or all of the preceding limitations. One relies upon adding computer capability into the toy. Interactive "Cabbage Patch" dolls are an example of such a toy. The "Furbee" is another example of such an approach. An alternate approach relies upon some external source of computing power to use the toy as a peripheral to the external computer. Such as U.S. Pat. No. 5,873,765 by Mattel, Incorporated, where phrases and responses are downloaded to the doll by computer command. Some toy systems such as "Lego Mindstorms" may use a combination of both. An approach such as this does not take advantage of the additional abilities that come from treating the toy as an equal element in a network of services, such that the toy is both simple in itself, yet is limited in capability only by the services on the widest net it has access to.

Work at MIT has focused on toys in this capacity. For example, the project known as Oxygen, as described in and article entitled "The Future of Computing" August 1999, *Scientific American*, used the interactive devices as an element in a network of other information appliances. An advantage from such an approach is that the interactive device is not completely dependent upon a single remote system, which would limit flexibility. The disadvantage of the toys used as proofs of concept in project Oxygen, were that they used expensive computer interface technology; such as a $10,000 motion tracking system. The Oxygen system utilizes a mobile identification capability that allows the toy to interact with a child based on that child's individual likes and dislikes and allows the environment to play a part in how the toy behaves with the particular child. Prior art toys are incapable of recognizing the individual users likes and dislikes and are unresponsive to unpreprogrammed changes in the environment.

The prior art also discloses toys which respond to external devices; such as a VCR disclosed in U.S. Pat. No. 4,846,693, video game; such as, in U.S. Pat. No. 5,752,880, a remote control; such as in, U.S. Pat. No. 5,481,257 and additionally the Sony AIBO described in U.S. Pat. No. 5,870,527 all of which work on a constrained set of preprogrammed responses rather than responses that are downloaded into the device by the environment reacting to the user and device profile information contained within or pointed at by the device. None of the devices in the prior art are designed or enabled to take advantage of an existing network such as the Internet. Neither are they designed to interact with an individual based on the individual's personal profile or with an environment based on a profile of the environment or to interact with other devices in such a system. The devices are also not designed to leverage the capabilities of networked resources with the intent of reducing the cost and increasing the durability of the device while enhancing the capability.

A system made according to the present invention is composed of devices that enhance user enjoyment by enabling a means for interactive devices to respond to their surroundings, the surroundings to respond to the interactive devices and for allowing the interactive devices to respond to one or more users. For the purposes of the present invention, a user shall include any operator or owner of the device with an emphasized relationship. For example, besides human beings, "user/owner's" of a device may be schools, towns, businesses, museums, organizations or other non-human entity.

A system made according to the present invention also provides a unique identity to the device and allows the device access to the unique identity (in the form of a profile) of the user or users. This system improves the ratio of the cost to capability of any device participating in the system, by reducing or eliminating hardware redundancy within the system. Wherever a capability exists, all other devices participating in the system can leverage its benefit for their own function.

SUMMARY OF THE INVENTION

In accordance with one aspect of the present invention there is provided a system for controlling the operation of a device in accordance with a user's personal profile, comprising:

a device for interaction with a user, the device having a first communication device;

a computer having a second communication device capable of communicating with the first communication device over a communication network, the computer providing instructions to the device for controlling the operation of the device in response to a stored user's personal profile.

In accordance with another aspect of the present invention, there is provided a system for controlling the operation of a device in accordance with a user's personal profile, comprising:

a device for interaction with a user, the device having a first communication device;

a computer having a second communication device capable of communicating with the first communication device over a communication network, the computer providing instructions to the device for controlling the operation of the device in response to the data received from the device being used with the user.

In accordance with another aspect of the present invention, there is provided a method for controlling the actions of the device within a local environment with respect to a specific user, comprising the steps of:

obtaining data from the device with respect to the user or the local environment;

processing the data with respect to a profile of the user or the local environment of the device so as to obtain instructions for the device; and providing the instructions to the device for implementation by the device.

In accordance with still another aspect of the present invention, there is provided a computer software product method for controlling the actions of the device within a local environment with respect to a specific user such that when loaded on to a computer will cause the computer to do the following steps of:

obtaining data from a device with respect to the user or the local environment;

processing the data with respect to a profile of the user or the local environment of the device so as to obtain instructions for the device; and providing the instructions to the device for implementation by the device.

These and other aspects, objects, features and advantages of the present invention will be more clearly understood and appreciated from a review of the following detailed description of the preferred embodiments and appended claims and by reference to the accompanying drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

Figure 1A:
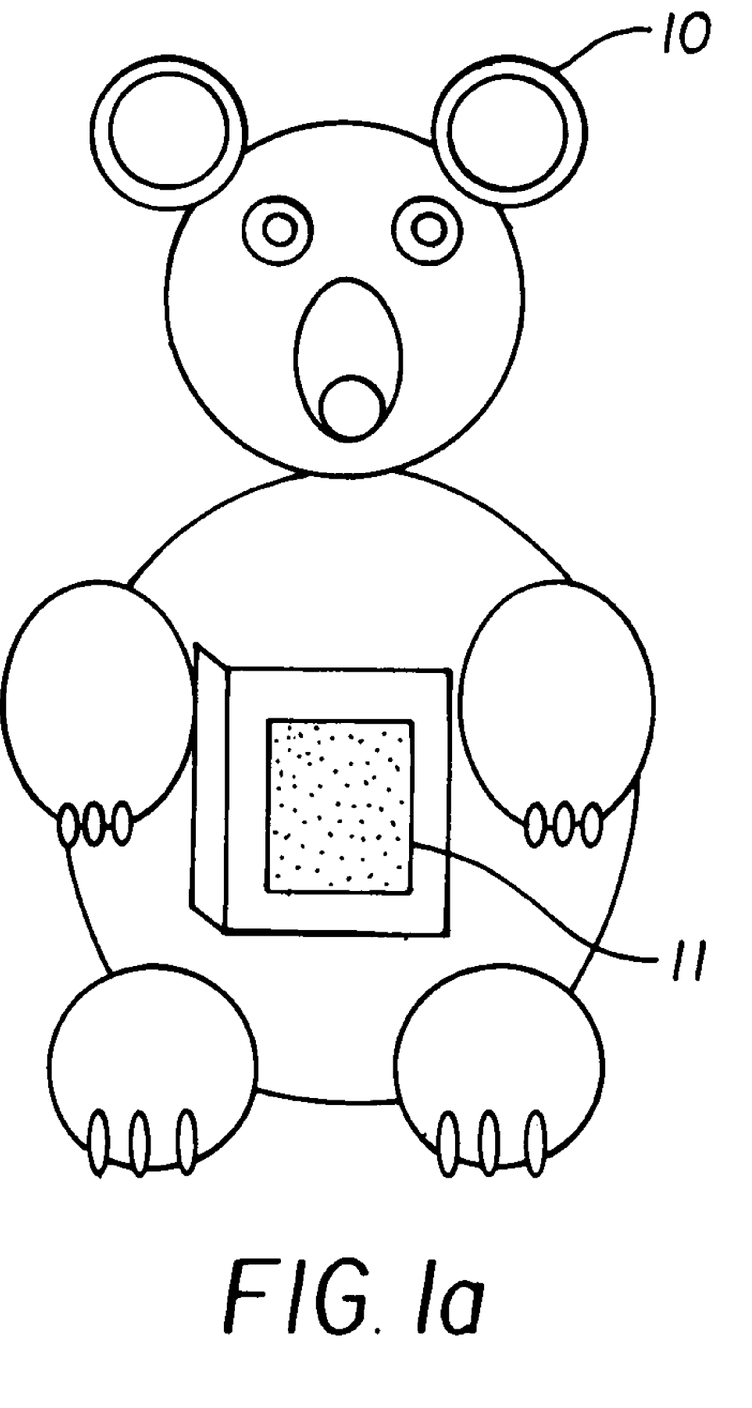
FIG. 1a is an illustration of a device made in accordance with the present invention.
Figure 1B:
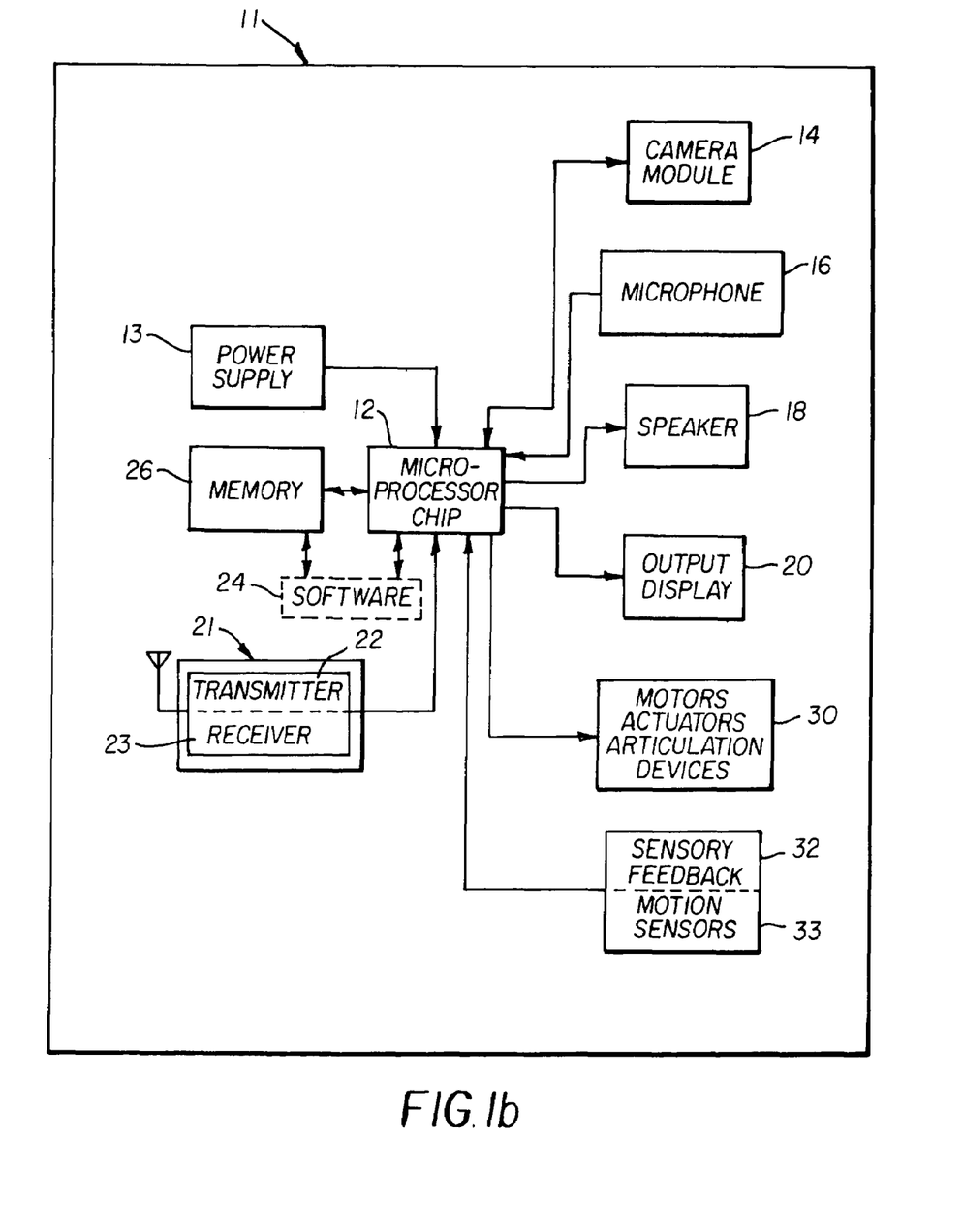
FIG. 1b is a block diagram illustrating the operating elements of the device of FIG. 1 for use in a system also made in accordance with the present invention.

Referring to FIG. 1a there is illustrated a device 10 made in accordance with the present invention that is used in a system 39 (see FIG. 2) also made in accordance with the present invention. FIG. 1b is a schematic diagram of various operating components 11 provided in device 10. The system 39 controls the operation of the device 10 in accordance with a user's personal profile. In the particular embodiment illustrated in FIG. 1a, the device 10 includes a microprocessor chip 12 powered by a power supply 13, connected to a camera module 14 for capturing images, a microphone 16, a speaker 18, an output display device 20 and a communications module 21. It is to be understood that camera module 14, microphone 16, speaker 18, and display device 20 may be of any suitable design and construction as is currently available or that may become available. Communications module 21 comprises a transmitter 22 and a receiver 23 for wireless communication. This allows the device to be easily handled and/or moved around by the user. The microprocessor chip 12 using software architecture 24 contained in memory 26 controls motors, actuators and articulation devices 30, along with sensory feedback device 32 and motion sensors 33. Note that the device 10 can have as many or few components as desired and these components may be separate or combined. The microprocessor chip 12 also interacts directly through the communications module 22 with existing communication networks such as the Internet. In order to minimize the cost of device 10 the components may be constructed of the lower cost variety whereby only the desired information to be gathered is obtained leaving the more complex software and computing components to devices that communicate with device 10. For example the device 10 may be provided with a GPS system for identifying the physical location of the device that can be used in the interaction of the device with the user. In the embodiment illustrated, the device 10 is in the form of a toy and more particular a teddy bear. However, the present invention is not so limited and may apply to any device with which individuals may interact. The device 10 is designed to interact with an individual's personal profile (no matter where the individual is located) or the surrounding environment.

Figure 1C:
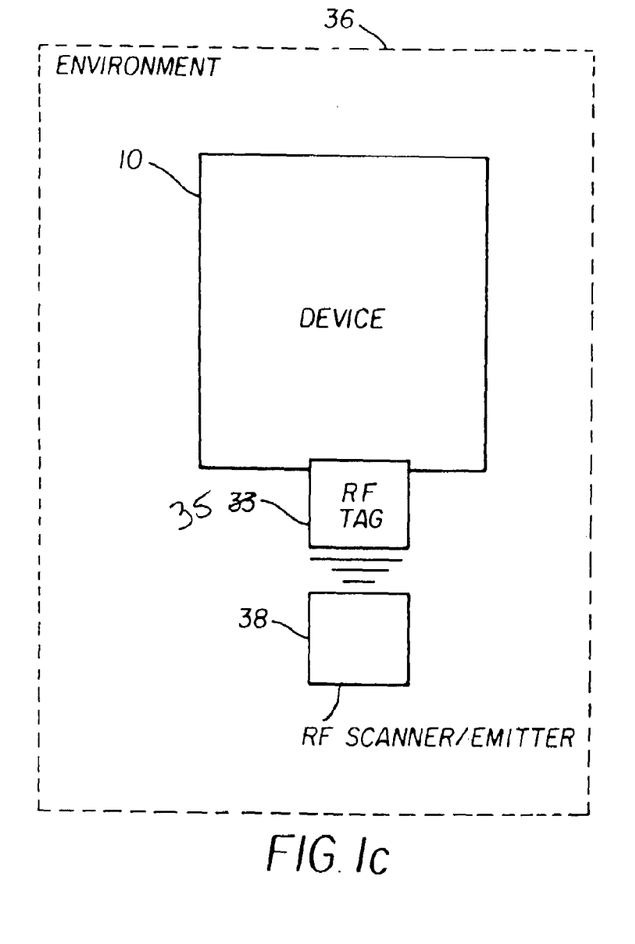
FIG. 1c is a diagram of passively activating a system for use in the device of FIG. 1.
Figure 1D:
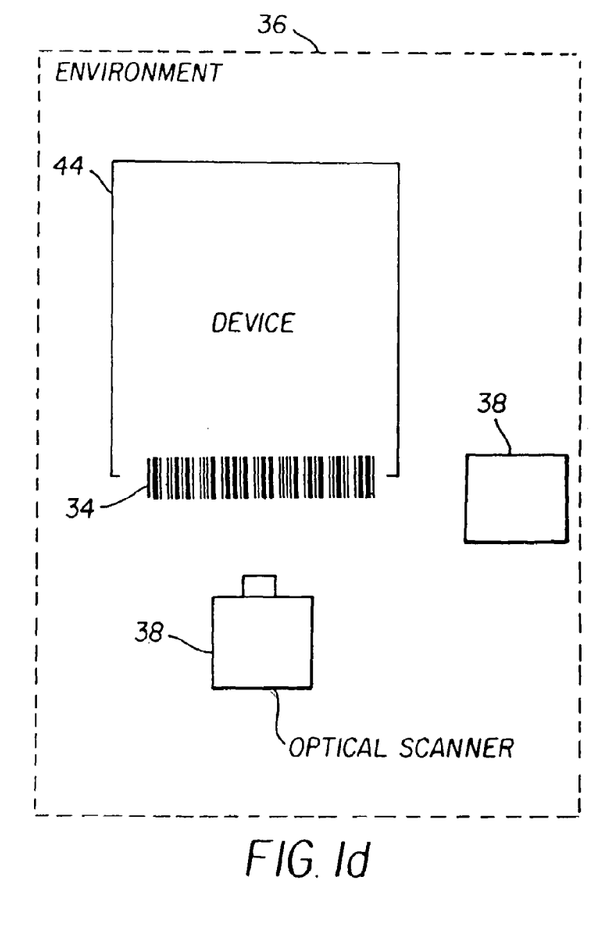
FIG. 1d is a diagram of an active activating system for use in the device of FIG. 1.

Referring to FIG. 1c, there is illustrated one manner in which the identity of device 10 is activated. In particular FIG. 1c illustrates operation of the device 10 in a passive mode. As such the identity of device 10 is passively interrogated (identified) through the use of an RF tag 33 such as the "Speed Pass" system. Alternatively, as illustrated by FIG. 1d the identity of the device 10 can be actively stated for example through the use of a visual identification method such as an indicia 34. Indicia 34 can be a bar code or other means/indicia that is detectable in either the visible or non-visible wavelengths. This allows the device 10 to be uniquely identified and addressed by other devices 44 (shown in FIG. 2) participating in the environment 36. The environment 36 can contain additional devices 38 such as RF or optical scanners for determining if there is present a device 10 capable of interacting with the user or environment. The device 10 may also include a logic system for determining if there is a computer available in the local environment capable of interacting with the device 10 and/or obtaining the personal profile of the user of the device.

The information that is sent and received by device 10 can come from another device (in a peer to peer system) or from a server (in a client-server system) or both in a hybrid system as is later discussed in detail.

Figure 2:
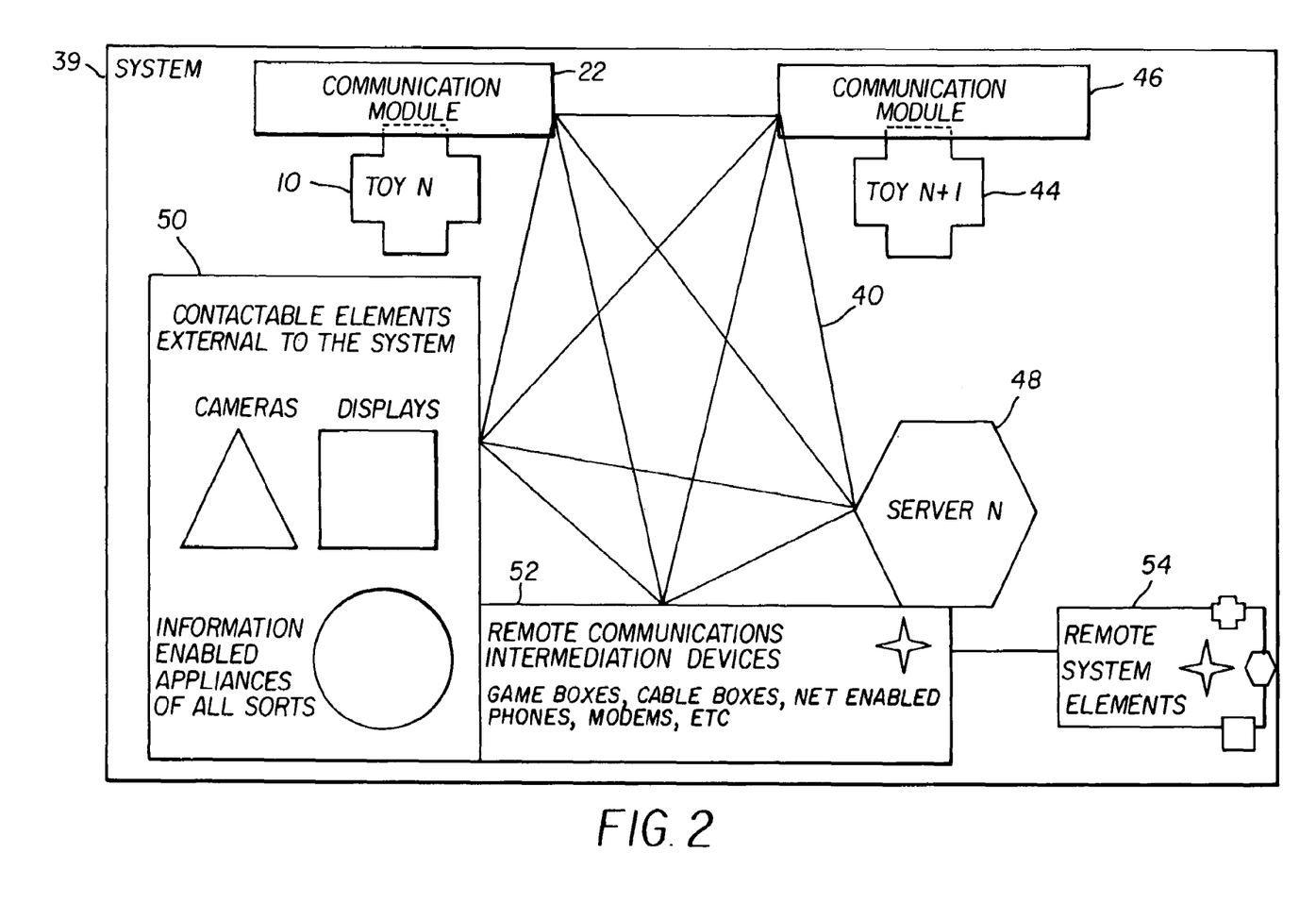
FIG. 2 is a block diagram of a system and associated networked elements made in accordance with the present invention.

Referring now to FIG. 2, there is illustrated a block diagram of a system 39 made in accordance with the present invention. System 39 includes a communications network 40 that connects device 10 with another similar device 44 via communications modules 21 and 46 respectively, within a local environment 36 and with other devices in distant locations through a communication network 40. In the particular embodiment illustrated, communication network 40 comprises the Internet. However it is to be understood that the communications network may comprise any other system; for example wireless RF systems, cell phone systems, infrared, sonic systems, and optical systems. It should be understood that other devices in the local environment 36 may be used to connect to the network 40. Examples of such other devices are a home computer/server 48, contactable devices 50, such as cameras, displays, storage or processors, remote communications devices 52, such as cell phones, cable boxes, modems, faxes, and game boxes and remote contactable devices 54 (elements such as those already listed but located at a remote location reachable by communications devices 52). The devices are connected by the network 40 by appropriate protocols and languages that enable both peer-to-peer and client-server connections between the devices. The various outputs of device 10 and various other items in the local environment 36 are provided to computer 48 wherein the obtained data is processed in accordance with software architecture 24 that has been provided thereon. The data is processed in computer 48 so as to provide interactive responses that can be forwarded to device 10 for implementation. The obtained data can be used to construct a personal profile of the user and can be adjusted over time due to actual use by the owner/user. In addition, a certain profile can be specifically designated. For example a parent may provide a certain profile for a child that can restrict the use of the device to control action. As illustrated by FIG. 2, there are provided two separate and distinct devices 10 and 44, each having appropriate sensor input devices and output features as previously discussed with respect to FIGS. 1a–d. The software architecture 24 is provided on the general, all-purpose computer 48 so as to minimize the cost of device 10. The computer 48 can, of course, be used to perform other desired functions typical of how such computers may be used. Since computer/server 48 is typically used for many other purposes, it may have substantial memory storage and computing power to handle substantially sophisticated software without incurring any additional cost to device 10. Also, since computer 48 is not subject to the same handling as device 10, there is a significantly less chance of causing damage to computer 48 as to device 10.

Figure 3:
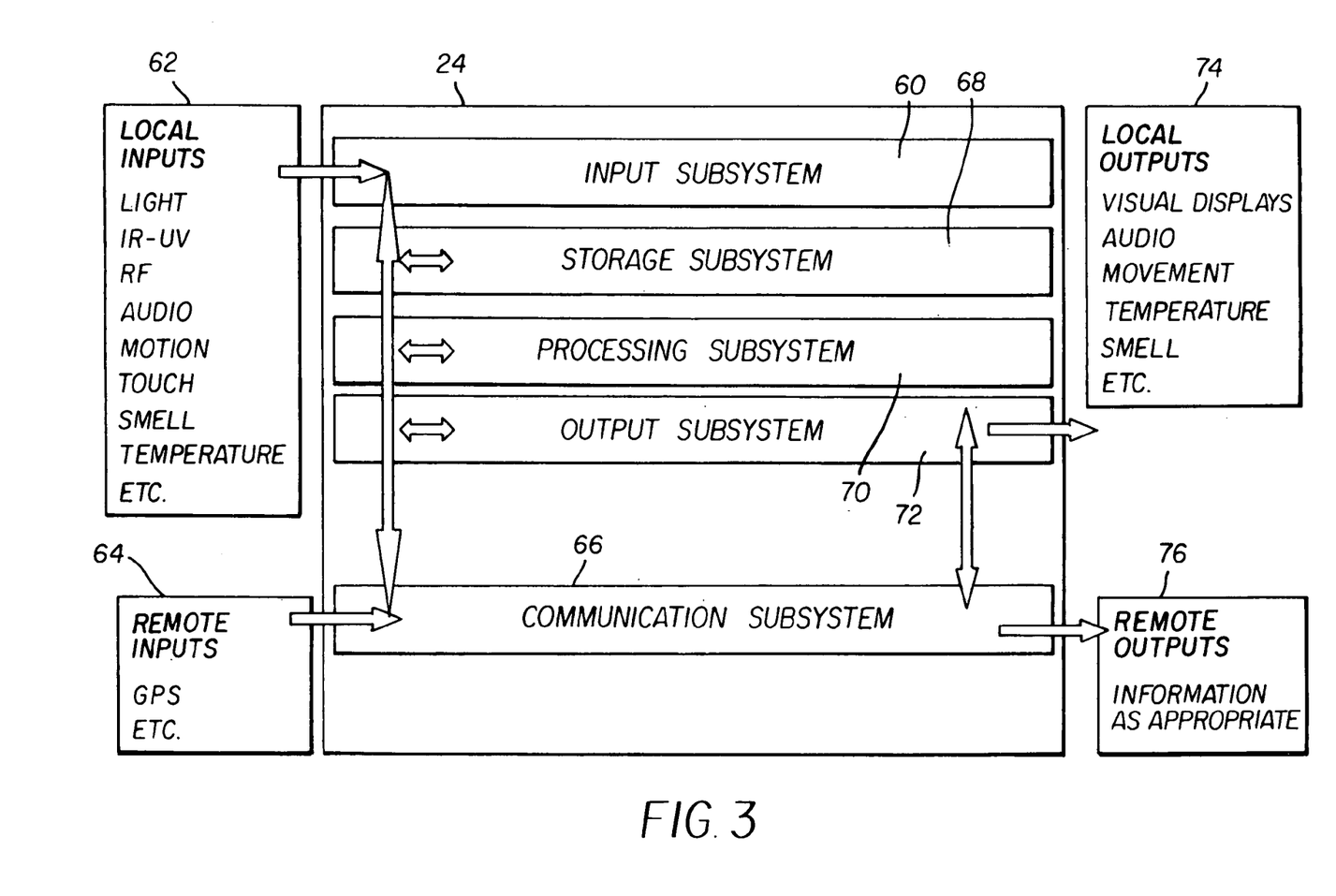
FIG. 3 is a block diagram illustrating software architecture for use in the system made in accordance with the present invention.

FIG. 3 is a block diagram illustrating the software architecture 24 which interacts with microprocessor 12 in the device 10 made in accordance with the present invention. The software architecture 24 is comprised of an input subroutine 60, which communicates with local inputs 62 comprising the sensory feedback devices 32, which are capable of detecting light waves, RF, audio, motion, pressure, smell and temperature. The software architecture 24 which runs across all the devices participating in system 39, enables communication between devices 10 or 44 and any other device (or devices) such as remote inputs 64 not in the local environment 36 via network communications 40 or by direct communication. An important advantage of the system 39, is the reduction of the cost of the device 10, by using not only the data contained in other devices, but also the processing power and software capabilities of other devices, such as computer 48. The capabilities of device 10 can be leveraged either by returning results to a requesting device or by transmitting programming, instructions and/or data to the requesting device 10 in keeping with the profiles of the device and the user(s) of the device 10. The input subroutine 60 also communicates with the storage subsystem 68 to store information (data and programming) for later use. For the purposes of the present invention, the device profiles can, for example, comprise the type and capabilities of the device and any information stored thereon. The personal profile of the user, of which there can be more than one, can include, the name, personal likes and dislikes of the users, or any other information that is relevant or of a personal nature to the user. This stored information may be used for the device and may be shared with other devices with the intent of propagating information amongst devices 10 that partake in the system 39 but which do not partake in the Internet either because of device limitations or because the device's environment does not allow a connection. This additional information propagation method further reduces the cost of the system devices while increasing their capability and robustness by making them less dependent on the state of a network. All that is required is that devices, for example 10, 44, 48, 50 and 52 in the system 39 recognize that certain messages should be automatically shared with certain devices at all times. For example, a device may pick up information meant for another device and carry that information until such time as it randomly encounters the destination device, much like a mailman carrying a letter for a person with an identity but without an address.

In this manner, the user and device profile information and pointers to such information can be sent and received between many devices in the network and directly between one another.

The software architecture 24 is also comprised of processing subroutine 70, which processes the incoming information. Having processed the incoming data, subroutine 70 performs operations on that data according to its programming and the programming it has received from the environment 36. For the purposes of the present invention, the "local environment" mean that all of the devices participating in the system 39 and that are external to a given device 10 and that can interact in some way with device 10. The software architecture 24 also processes outgoing information to cause an action to be performed by the output subsystem 72. Examples of outputs for device 10 might be voice, smell, motion, a visual display, temperature, dampness, taste, texture change or change of physical volume. In addition, data, instructions and programming may be sent to the local environment, resulting in complex interactions between the user, the device 10, other devices and other users where the users and devices may be in physical proximity or at remote locations. Output subsystem 72 communicates via the communications subsystem 66 to send information to the remote outputs 76, such as communications module 21 shown in FIG. 1b.

Figure 4:
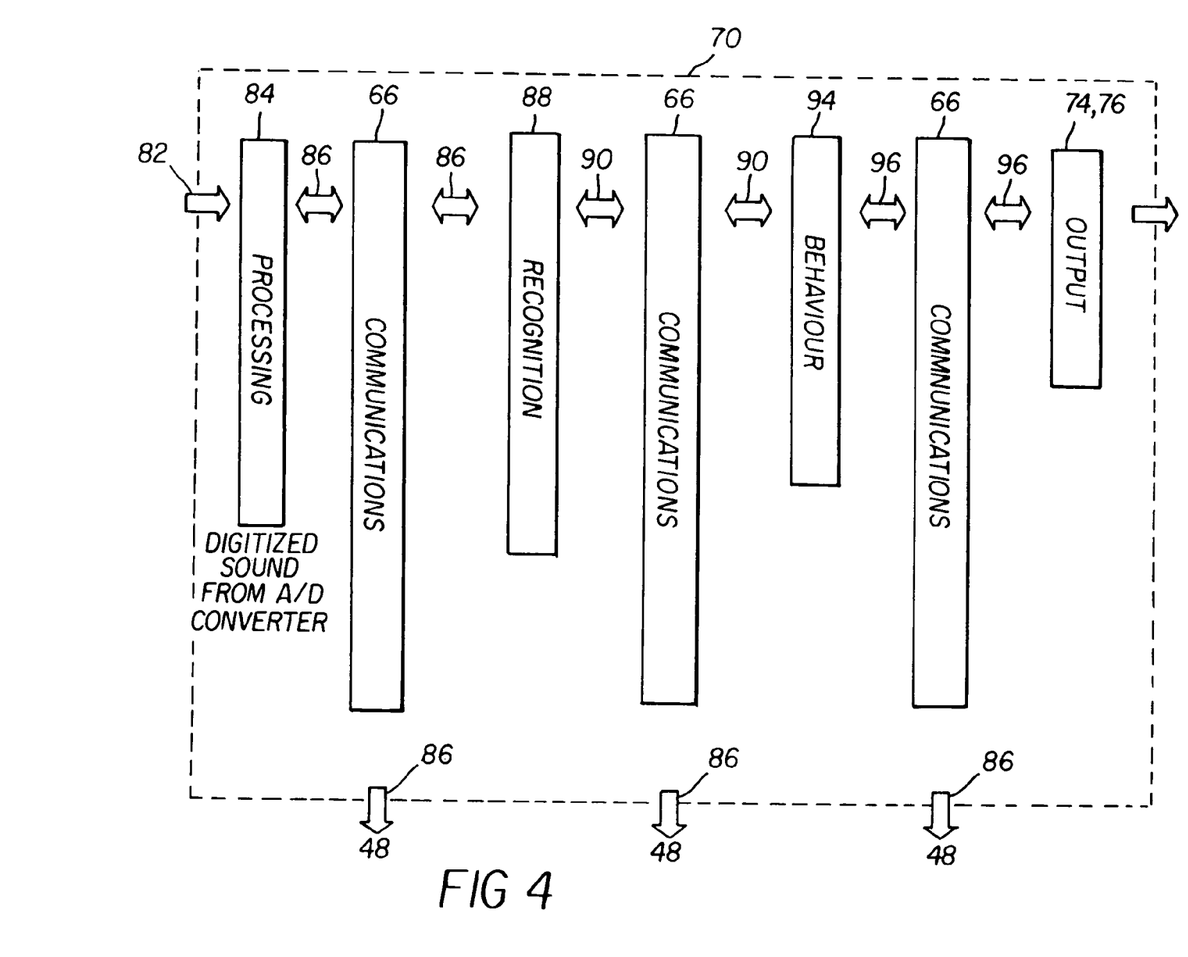
FIG. 4 is a block diagram illustrating the recognition subroutine of software for use in the software architecture made in accordance with the present invention.

FIG. 4 illustrates the function of the software architecture 24 data processing subroutine 70. The software architecture 24 receives a signal 82 from the inputs 62. The signal 82 can be digital or analog and can come from a variety of sources, such as a microphone, an electronic still or video camera, RF, GPS, a touch sensor, etc. in the local or remote environment. If the signal 82 is analoged the signal is digitized in step 84 using an A to D (analog to digital) converter. An important aspect of the present invention, is that the digitized output 86 from the A to D converter 84 of device 10 can be sent to an external device such as the server/computer 48 shown in FIG. 2 via the communications subsystem 66 at any point during the cycle for the purpose of using the external resources of the network to reduce the cost of components and enhance the capability of the device 10.

Once the digitized signal 86 is differentiated from noise and identified as to the type of action required at step 88, the appropriate action 90 is determined by using a lookup table, artificial intelligence or other means of computation at step 94. The action is converted to an output signal 96 and sent to the designated local or remote output device 74 or 76 shown in FIG. 3. The following example of the recognition process uses voice commands.

The general flow of information in this example is familiar to those versed in the art of system interface input recognition design and for that reason this process flow can be applied to commonly available input recognition devices and software of all kinds, for example, image recognition systems, gesture recognition systems and computing device input interfaces in general.

Figure 5:
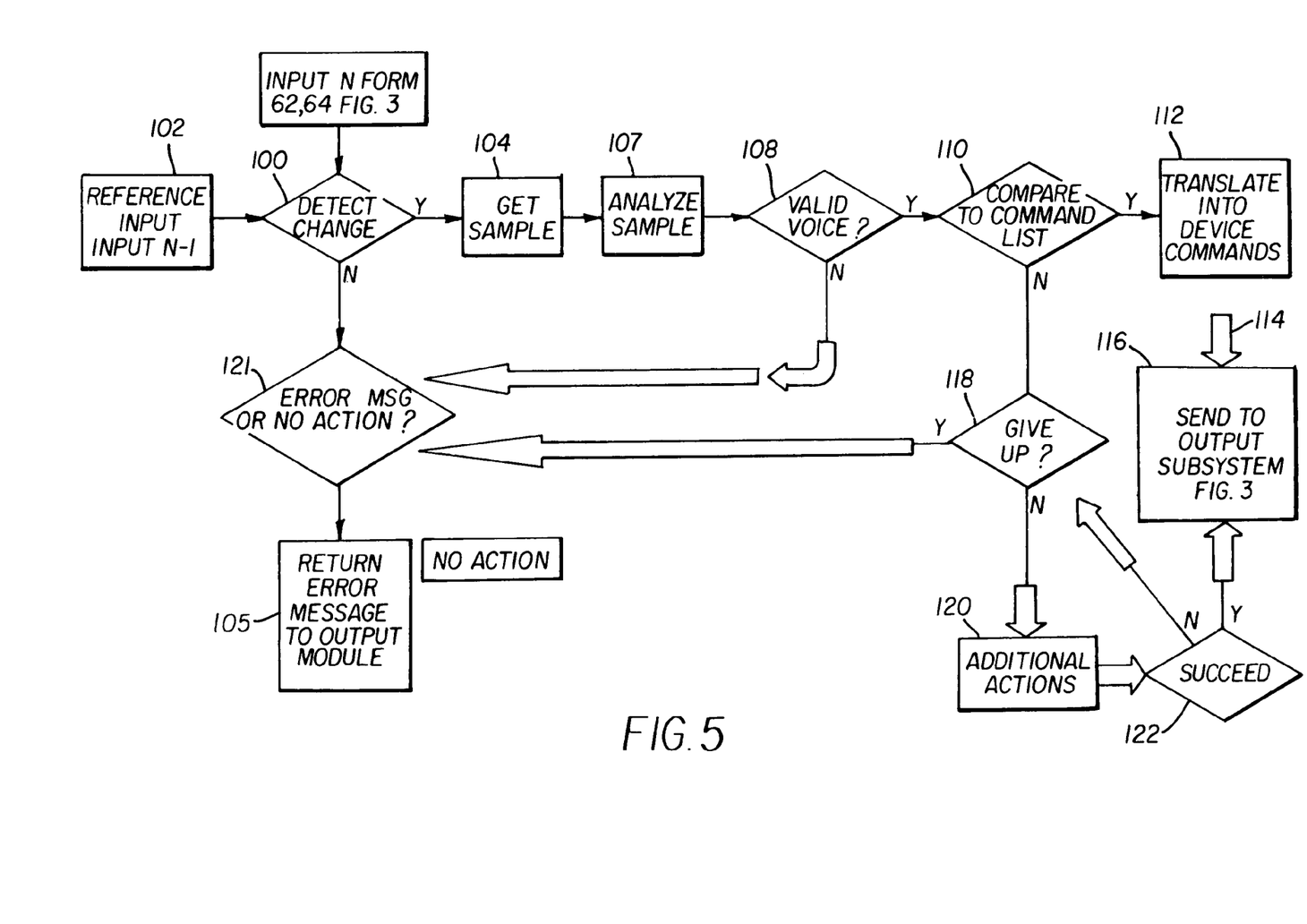
FIG. 5 is a block diagram of the voice recognition component of the recognition subroutine.

FIG. 5 illustrates a block diagram of how a voice command can be recognized by the recognition subsystem 88 shown in FIG. 4. A difference in the sound level of the environment is detected at block 100 by comparing processed input 86 from microphones/sound input devices 62, 64 shown in FIG. 3 to the immediately preceding input 102 from the same device(s). When a change is detected, a sample is collected at block 104 until input returns to the reference state 102. If no change is detected at 100 and there is no input into block 105 indicating an error, then no action is taken block 106.

Commercially available software such as that available from IBM is capable of determining whether the sample is a voice or a sound that should be recognized as carrying a command and if the voice or sound matches a previously sampled speaker or sound block 107. From this point on, it should be understood that when speaking of voice recognition, this includes any form of unique sound that can be recognized and interpreted as a command to the device.

Once the voice is recognized, a profile of that speaker's voice is used to improve analysis of the sample and convert it into words block 108. The words are then compared to a command list table at block 110 where a successful search results in the voice command being translated into device commands block 112. These device commands are sent to the output subsystem 72 shown in FIG. 3 to produce an appropriate response at block 116.

If the commands cannot be recognized, a decision must be made block 118, on whether the sample triggers additional actions block 120 or ends in error block 121. The decision is informed by resource considerations such as, but not limited to, the number of times the systems have tried additional actions to resolve the failure or the length of time taken to resolve the failure block 121.

Some typical actions resulting from a decision to continue trying to resolve the failure are: returning to block 100 to enlarge the sample, combining voice input information with input from other input devices 62, 64 to establish a larger context in which to better interpret the command, or going to additional systems available on the network to assist in completing the recognition task.

If the additional actions result in success 122, the results create appropriate action at block 116. If not, they return to block 118 to determine if further actions to achieve success should be undertaken.

Figure 6:
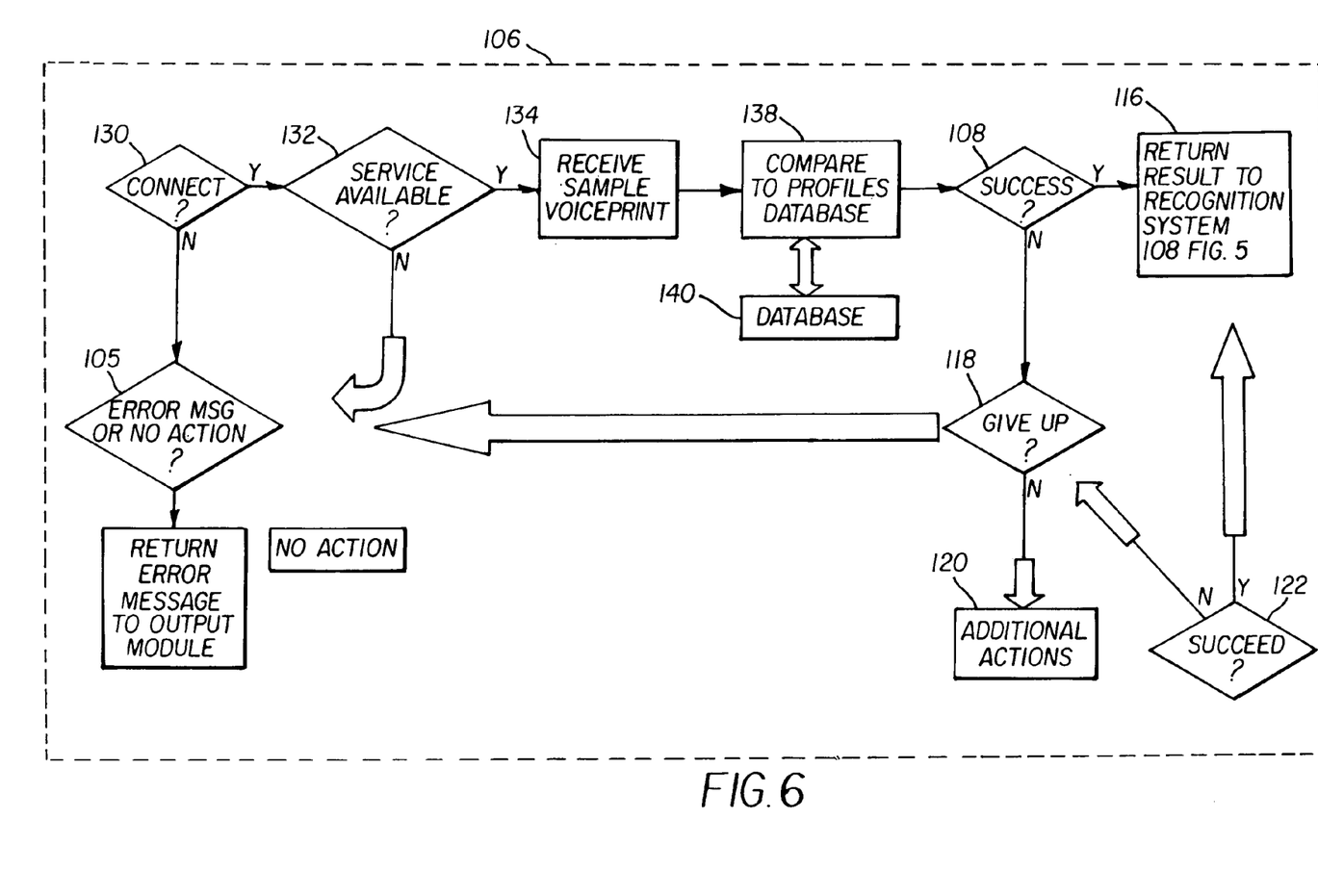
FIG. 6 is a flowchart of the process of recognizing a command when an initial effort fails.

FIG. 6 diagrams a more detailed example of what takes place at block 120 when the device uses the network to enhance its voice recognition capabilities by accessing information and resources available on additional systems. In the following discussion the term "service" shall be used to indicate the combination of information and resources (software, hardware, et al) accessible by the device in a manner that the toy receives a desired result.

Using means described earlier (see FIG. 3) to connect to a service bearing device or network, either the device 10 broadcasts a query seeking a compatible network 130 and services 132 or the device's environment broadcasts a signal. Once the connection signal is known to have been received, the network/service connection is made using a protocol such as but not limited to the Internet Protocol, the device sends the collected voice sample 134 to the available service. If no network or service is available, then failure is returned to block 105 of FIG. 5. Alternatively, the system may be designed in a manner familiar to those who design networking software, that the system retries creating a link as conditions change.

In this example, the voice sample is received by a service 134 that compares the sample voiceprint to a profile 138 that exists in addition to the initial profile information used at block 108 in FIG. 5. This additional profile information is stored in some combination of directory structure, database or other appropriate storage structure 140 anywhere on the network. Typically, this would be on a home computer of the owner/user of the device 10. The additional profile information improves the likelihood that the words, phrases and sentences in the sample will be recognized and interpreted. Such additional profile information may go beyond having additional samples of spoken words for comparison. Additional means of improving the likelihood of interpreting sound input into commands may include using images of the speaker's mouth picked up by image heads in the device or in the environment, biometric data (smell, heartbeat, skin impedance), speaker gesture data picked up by image capture devices in the environment and both motion tracking and gesture tracking equipment in the toy. Due to being part of a network, this additional speaker profile data and real-time data can then be used by more powerful software appropriate to the resources and services available on a network as opposed to the device 10.

The results are returned at block 122 for further processing at step 116. Alternatively, the processing can take place as a remote service and the device commands sent back to the device, thus reducing the computing burden on the device In one embodiment of this system, a device 10, such as a toy, enters a remote location, such as a museum. The museum is equipped with a system of services on computers whose nature and address are broadcast to the device 10 when the presence of device 10 is detected. The toy receives the broadcast and stores the address for the services for voice recognition, amongst other recognition protocols. The device 10 may provide a URL (universal resource locator) that can provide the electronic address of the location at which the software architecture 24 is located so that the computers/server at the museum may automatically access the home computer 48 for access of the software architecture 24 that can be used to allow interaction with device 10 with its new environment. The remote location can also be the home of a friend or relative having an appropriate computer that can communicate with the home computer 48. There can also be interactive action with another device owned or operated by other individuals, this other device having access to its own profiles. Thus, friends playing together can each have toys that interact with them personally and also with other individuals.

In response to the scanner or transmitter in the environment or as a regularly timed broadcast, the toy sends out its device profile and its one or more user profiles. The profile information can be in the form of both direct information about the toy and pointers to further information about both the device and the user located either on some other device that can be linked to directly or by way of some remote device that can be reached on the Internet.

Once this additional information is available, a ready message is sent that places the toy in a mode where the toy sends voice samples, as they are collected. In addition, the environment may use additional resources to create command streams it sends back to the device 10 that enable the device 10 to perform in ways unique to a given environment.

In a museum of paleontology, the toy may respond to a question by answering in human speech, roaring like a dinosaur, pointing at signs or objects appropriate to the user question, emitting an odor or acting like a dinosaur in conjunction with other toys that may also be behaving like dinosaurs. At an amusement park, the device 10 (toy) may respond with the catchphrases and behaviors of a popular entertainment characters, which partake in the park's theme.

It should be noted that the communication system used by the device 10 can be of the widely used client/server type, or it can be a peer-to-peer type familiar to those conversant in the art of networking. In a peer-to-peer model, an additional step is added to the manner in which communications are initiated. The step requires that the toy query a services listing device, such as that used in the Jini system of peer-to-peer connection, that would transfer a copy of the services available for the network, which the device 10 has joined.

In an alternate operation of a system according to the present invention, one of the devices 10a can be used to convey information and/or instructions to a second device 10b. It may be possible for device 10 to obtain information or instructions from a local computer 48. The device 10a can have sufficient intelligence such that this information can be transmitted to a second device 10b that is in the local environment of 10a. For example, device 10a may be in a Museum where information is obtained from a local computer. Then device 10a brought into proximity with a second device 10b. The device 10a recognizes device 10b and therefore transmits the information and/or instruction to the second device 10b, whereby 10b incorporates the information or carries out the instruction in it's interaction with it's user or device 10a. This process may be repeated with successive devices so that an interaction of one device can be spread to various non-connected devices.

The invention has been described in detail with particular reference to certain preferred embodiments thereof, but it will be understood that variations and modifications can be effected within the scope of the invention.

PARTS LIST

| | |
|---|---|
| 10 | device |
| 11 | components |
| 12 | microprocessor chip |
| 13 | power supply |
| 14 | camera module |
| 16 | microphone |
| 18 | speaker |
| 20 | display device |
| 21 | module |
| 22 | transmitter |
| 23 | receiver |
| 24 | software architecture |
| 26 | memory |
| 30 | articulation devices |
| 32 | feedback device |
| 33 | RF tag |
| 34 | Indicia |
| 36 | environment |
| 39 | system |
| 40 | communication network |

-continued

PARTS LIST

| | |
|---|---|
| 44 | devices |
| 46 | communication modules |
| 48 | computer/server |
| 50 | device |
| 52 | device |
| 60 | input subroutine |
| 62 | local inputs device |
| 64 | device |
| 68 | storage subsystem |
| 70 | subroutine |
| 72 | output subsystem |
| 74 | device |
| 76 | remote outputs device |
| 82 | signal |
| 84 | step |
| 86 | subsystem |
| 88 | subsystem |
| 90 | action |
| 94 | step |
| 96 | output signal |
| 100 | block |
| 102 | input |
| 104 | block |
| 105 | block |
| 106 | block |
| 107 | block |
| 108 | block |
| 110 | block |
| 112 | block |
| 116 | step |
| 118 | block |
| 120 | block |
| 121 | block |
| 122 | success |
| 130 | network |
| 132 | services |
| 134 | voice sample |
| 138 | profile |
| 140 | storage structure |

What is claimed is:

1. A system for controlling the operation of an interactive device in accordance with a user's personal profile, comprising:

an interactive device designed to provide self-generating interaction with one or more users, said interactive device having information obtaining means for independently obtaining the identity of said one or more users and for determining at least one aspect of the local environment in which said interactive device is located at the time of operation of said interactive device; and a computer for providing instructions to said interactive device for controlling the operation of said interactive device in response to a stored personal profile of said one or more users and said at least one aspect the local environment.

2. A system according to claim 1 wherein said means for determining one aspect of the local environment comprises a wireless communication device.

3. A system according to claim 1 wherein said interactive device further comprises a wireless communication device for communicating with said computer.

4. A system according to claim 1 wherein said interactive device further comprises a wireless communication device for use in determining said at least aspect of said local environment.

5. A system according to claim 1 wherein said at least one aspect of said local environment comprises a second device having means for providing information about said second device to said interactive device.

6. A system according to claim 5 wherein said interactive device interacts directly with said second device.

7. A system according to claim 5, wherein said computer obtains additional data from other sources other than said interactive device for use in providing instructions to said interactive device.

8. A system according to claim 5 wherein said interactive devices communicates with a second computer which interns communicates with said computer for providing instructions which is located remote from said interactive device.

9. A system according to claim 8, wherein said interactive device provides a URL to said second computer for accessing said computer for providing instructions.

10. A system according to claim 5, wherein said computer is part of said interactive device.

11. A system according to claim 5, wherein said interactive device further comprises a GPS system for determining the location of said interactive device.

12. A system according to claim 5, wherein said computer monitors the data received from said interactive device so as to construct and/or adjust a personal profile of said one or more users.

13. A system according to claim 5, wherein a plurality of personal profiles are stored with respect to said one or more users.

14. A system according to claim 5, wherein said computer is provided with a control circuit for controlling certain aspects of the operation of said device.

15. A system according to claim 14, wherein a person other than said one or more users can control the operation of said interactive device.

16. A system according to claim 5, wherein a second interactive device interacts with said first interactive device so as to obtain information and/or instructions that have been obtained from said computer.

17. A system according to claim 16, wherein said second interactive device passes said information and/or instructions to a third interactive device.

18. A system according to claim 1 wherein said means for obtaining the identity of said one or more users is recognition of a physical characteristic.

19. A method for controlling the actions of an interactive device within a local environment with respect to a specific user or users, comprising the steps of:
said interactive device independently obtaining identity of and data with respect to said specific user or users and said local environment in which said interactive device is located at the time of operation of said interactive device;
obtaining the personal profile of said user or users;
processing said data with respect to said personal profile and said local environment so as to obtain instructions for providing continuous self-configuring operation of said interactive device; and
said interactive device implementing said instructions.

20. A method according to claim 19, further comprising the step of updating said personal profile of said user or users based on use of said interactive device by said user.

21. A method according to claim 19, wherein said processing of said data is based on a profile that is located at a remote location with respect to the local environment in which said device is located.

22. A method according to claim 21, further comprising the step of obtaining additional data from other devices in the local environment and using said additional data for providing said instructions.

23. A computer software product method
for controlling the actions of device within a local environment with respect to a specific user such that when loaded onto a computer will cause said computer to do the following steps of:
said interactive device independently obtaining identity of and data with respect to said specific user or users and said local environment in which said interactive device is located at the time of operation of said interactive device;
obtaining the personal profile of said user or users;
processing said data with respect to said personal profile so and said local environment as to obtain instructions for providing continuous self-configuring operation of said interactive device; and
said interactive device implementing said instructions.

24. A computer software product according to claim 23, further comprising the step of updating said personal profile of said user or users based on use of said interactive device by said user.

25. A method according to claim 24, wherein said processing of said data is based on a profile that is located at a remote location with respect to the local environment in which said device is located.

26. A method according to claim 24, further comprising the step of obtaining additional data from other devices in the local environment and using said additional data for providing said instructions.

* * * * *